(12) United States Patent
Leong et al.

(10) Patent No.: US 8,278,861 B2
(45) Date of Patent: Oct. 2, 2012

(54) EXTERNAL DISTURBANCE DETECTION SYSTEM AND METHOD FOR TWO-PHASE MOTOR CONTROL SYSTEMS

(75) Inventors: Foo Leng Leong, Singapore (SG); Edy Susanto, Singapore (SG); Ravishanker Krishnamoorthy, Singapore (SG)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/453,661

(22) Filed: Apr. 23, 2012

(65) Prior Publication Data
US 2012/0206072 A1 Aug. 16, 2012

Related U.S. Application Data

(63) Continuation of application No. 12/480,259, filed on Jun. 8, 2009, now Pat. No. 8,164,285.

(60) Provisional application No. 61/114,158, filed on Nov. 13, 2008.

(51) Int. Cl.
*H02P 6/18* (2006.01)
(52) U.S. Cl. ............ 318/400.35; 318/400.12; 318/805; 318/806; 318/809; 318/810; 318/400.32; 318/400.36; 318/615; 318/667; 318/459; 318/799; 318/800
(58) Field of Classification Search ............ 318/400.12, 318/805, 806, 809, 810, 400.35, 400.36, 318/400.32, 459, 799, 800, 615, 667
See application file for complete search history.

(56) References Cited

U.S. PATENT DOCUMENTS

| | | | |
|---|---|---|---|
| 4,684,866 A | 8/1987 | Nehmer et al. | |
| 5,128,825 A | 7/1992 | Hurley et al. | |
| 5,859,520 A | 1/1999 | Bourgeois et al. | |
| 6,215,261 B1 * | 4/2001 | Becerra ..................... | 318/400.26 |
| 6,900,657 B2 * | 5/2005 | Bui et al. ................. | 324/765.01 |
| 6,949,900 B1 | 9/2005 | Berringer | |
| 6,979,970 B2 * | 12/2005 | Iwanaga et al. .......... | 318/400.35 |
| 7,122,985 B2 * | 10/2006 | Kikuchi ................... | 318/400.34 |
| 7,183,734 B2 * | 2/2007 | Lassen .................... | 318/400.34 |
| 7,514,888 B2 | 4/2009 | Bakker et al. | |
| 7,876,522 B1 | 1/2011 | Calaway et al. | |
| 2005/0225272 A1 | 10/2005 | Wu et al. | |
| 2010/0134055 A1 | 6/2010 | Leong et al. | |

OTHER PUBLICATIONS

Brushless DC Electric Motor; Wikipedia, the free encyclopedia; http://en.wikipedia.org/wiki/Brushless_DC_electric_motor; Apr. 29, 2009; 6 pages.

* cited by examiner

*Primary Examiner* — Rita Leykin

(57) ABSTRACT

A system includes a power control module, a period determination module, and a control module. The power control module controls current through stator coils of a motor to rotate a rotor. The period determination module determines a first length of time between a first set of induced stator coil voltages and determines a second length of time between a second set of induced stator coil voltages. The control module determines whether an external disturbance disturbs rotation of the rotor based on a difference between the first and second lengths of time.

14 Claims, 9 Drawing Sheets

Driving Rotor Using Pulse-Width Modulation

Rotor at Position A

Rotor at Position B

EXTERNAL DISTURBANCE DETECTION SYSTEM AND METHOD FOR TWO-PHASE MOTOR CONTROL SYSTEMS

CROSS-REFERENCE TO RELATED APPLICATIONS

This application is a continuation of U.S. patent application Ser. No. 12/480,259 filed on Jun. 8, 2009. This application claims the benefit of U.S. Provisional Application No. 61/114,158, filed on Nov. 13, 2008. The disclosure of the above application is incorporated herein by reference in its entirety.

FIELD

The present disclosure relates to electric motor control, and more particularly to detecting when an external force disturbs rotation of a rotor.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cooling fan assemblies may provide airflow to dissipate heat generated by electronic components. Cooling fan assemblies may include a motor that drives fan blades via a rotor. The speed of the rotor may be adjusted to adjust airflow and heat dissipation.

Referring now to FIG. 1, a cooling fan system 100 includes a motor 102 and a motor control module 104. The motor 102 may include a two-phase brushless direct current (DC) motor. The motor 102 may include four stator poles: pole A1 106, pole A2 108, pole B1 110, and pole B2 112. Pole A1 106 and pole A2 108 may collectively be called "pole pair A." Pole pair A may be wound with a stator coil 114 (hereinafter "coil A 114"). Pole B1 110 and pole B2 112 may collectively be called "pole pair B." Pole pair B may be wound with a stator coil 115 (hereinafter "coil B 115"). The motor control module 104 may apply a voltage and/or current to coil A 114 to generate a magnetic field between pole A1 106 and pole A2 108. Applying the voltage and/or current to coil A 114 may be called "driving phase A." The motor control module 104 may apply the voltage and/or current to coil B 115 to generate a magnetic field between pole B1 110 and pole B2 112. Applying the voltage and/or current to coil B 115 may be called "driving phase B."

The motor 102 includes a rotor 116. The rotor 116 may include at least one permanent magnet. The motor control module 104 may drive phase A and/or phase B to actuate the rotor 116 about an axle 118. The axle 118 may mechanically couple the rotor 116 to a device. For example, the axle 118 may mechanically couple the rotor 116 to a fan 120 used to cool electronic components. While the rotor 116 in FIG. 1 rotates between the stator poles 106, 108, 110, 112, the motor 102 may include a rotor that surrounds the stator poles 106, 108, 110, 112.

The motor control module 104 may alternate between driving phase A and driving phase B to rotate the rotor 116. The motor control module 104 may drive phase A twice and drive phase B twice to rotate the rotor 116 one revolution. For example, the motor control module 104 may drive phase A, then drive phase B, then drive phase A, then drive phase B to rotate the rotor 116 one revolution.

The motor 102 may include at least one Hall-effect sensor 122 that indicates rotation of the rotor 116. For example, the Hall-effect sensor 122 may generate a pulse when a magnetic pole of the rotor 116 passes the Hall-effect sensor 122. The motor control module 104 may determine a rotational speed of the rotor 116 based on the pulses from the Hall-effect sensor 122.

Referring now to FIG. 2A, the motor 102 may be connected to a power supply that provides a power supply voltage ($V_{Supply}$). $V_{Supply}$ may be connected to a common termination 154 (hereinafter "center tap 154") of coil A 114 and coil B 115 via a diode 123. The diode 123 may protect against reverse voltage.

Transistor A 150 may connect coil A 114 to ground when a voltage is applied to a gate of transistor A 150. The power supply may provide current through coil A 114 when transistor A 150 connects coil A 114 to ground. Accordingly, the motor control module 104 may apply a voltage to transistor A 150 to drive phase A. Node voltage $V_A$ may be near ground when the motor control module 104 drives phase A.

Transistor B 152 may connect coil B 115 to ground when a voltage is applied to a gate of transistor B 152. The power supply may provide current through coil B 115 when transistor B 152 connects coil B 115 to ground. Accordingly, the motor control module 104 may apply a voltage to transistor B 152 to drive phase B. Node voltage $V_B$ may be near ground when the motor control module 104 drives phase B.

The motor control module 104 may reduce the voltage applied to transistor A 150 to turn off transistor A 150. Current may not flow through coil A 114 when transistor A 150 is turned off. The motor control module 104 may reduce the voltage applied to transistor B 152 to turn off transistor B 152. Current may not flow through coil B 115 when transistor B 152 is turned off.

Referring now to FIG. 2B, the graph illustrates driving phase A and driving phase B based on signals from the Hall-effect sensor 122. The motor control module 104 may drive the motor 102 using pulse-width modulation (PWM) driving signals when the speed of the rotor 116 is less than full speed. The PWM driving signals may include a series of driving pulses as illustrated at 155. The motor control module 104 may control a duty cycle of the driving pulses to control the speed of the rotor 116.

SUMMARY

A system comprises a power control module, a period determination module, and a control module. The power control module controls current through stator coils of a motor to rotate a rotor. The period determination module determines a first length of time between a first set of induced stator coil voltages and determines a second length of time between a second set of induced stator coil voltages. The control module determines whether an external disturbance disturbs rotation of the rotor based on a difference between the first and second lengths of time.

In other features, the period determination module determines that the rotor induces one of the induced stator coil voltages when a voltage across one of the stator coils is less than or equal to a predetermined voltage.

In other features, the power control module controls current through the stator coils to accelerate the rotor.

In other features, the control module determines that a force has disturbed rotation of the rotor when the second length of time is greater than or equal to the first length of time, and wherein at least one induced stator coil voltage of the second set occurs after the first set of induced stator coil voltages.

In other features, the power control module controls current through the stator coils to rotate the rotor at a target speed.

In other features, the control module determines that a force has disturbed rotation of the rotor when a magnitude of the difference is greater than a threshold, and wherein at least one induced stator coil voltage of the second set occurs after the first set of induced stator coil voltages.

In other features, the first set of induced stator coil voltages includes a first voltage induced in a first stator coil and a second voltage induced in a second stator coil, and wherein the second set of induced stator coil voltages includes the second voltage induced in the second stator coil and a third voltage induced in the first stator coil.

In still other features, a method comprises controlling current through stator coils of a motor to rotate a rotor. The method further comprises determining a first length of time between a first set of induced stator coil voltages and determining a second length of time between a second set of induced stator coil voltages. Additionally, the method comprises determining whether an external disturbance disturbs rotation of the rotor based on a difference between the first and second lengths of time.

In other features, the method comprises determining that the rotor induces one of the induced stator coil voltages when a voltage across one of the stator coils is less than or equal to a predetermined voltage.

In other features, the method comprises controlling current through the stator coils to accelerate the rotor. The method further comprises determining that a force has disturbed rotation of the rotor when the second length of time is greater than or equal to the first length of time, wherein at least one induced stator coil voltage of the second set occurs after the first set of induced stator coil voltages.

In other features, the method comprises controlling current through the stator coils to rotate the rotor at a target speed.

In other features, the method comprises determining that a force has disturbed rotation of the rotor when a magnitude of the difference is greater than a threshold, wherein at least one induced stator coil voltage of the second set occurs after the first set of induced stator coil voltages.

In other features, the method comprises determining the first length of time between the first set of induced stator coil voltages, wherein the first set of induced stator coil voltages includes a first voltage induced in a first stator coil and a second voltage induced in a second stator coil. The method further comprises determining the second length of time between the second set of induced stator coil voltages, wherein the second set of induced stator coil voltages includes the second voltage induced in the second stator coil and a third voltage induced in the first stator coil.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
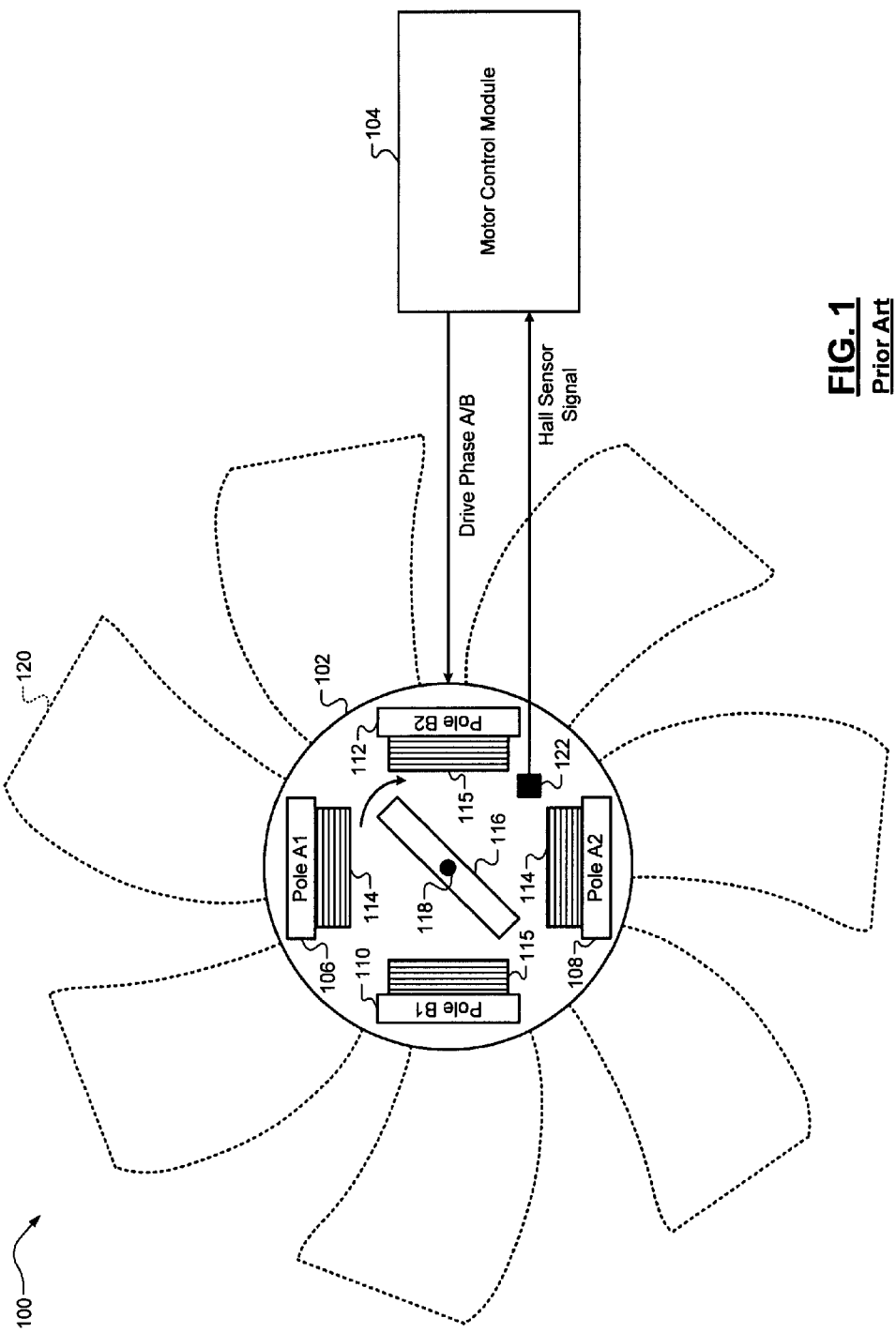
FIG. 1 is a cooling fan system according to the prior art.
Figure 2A:
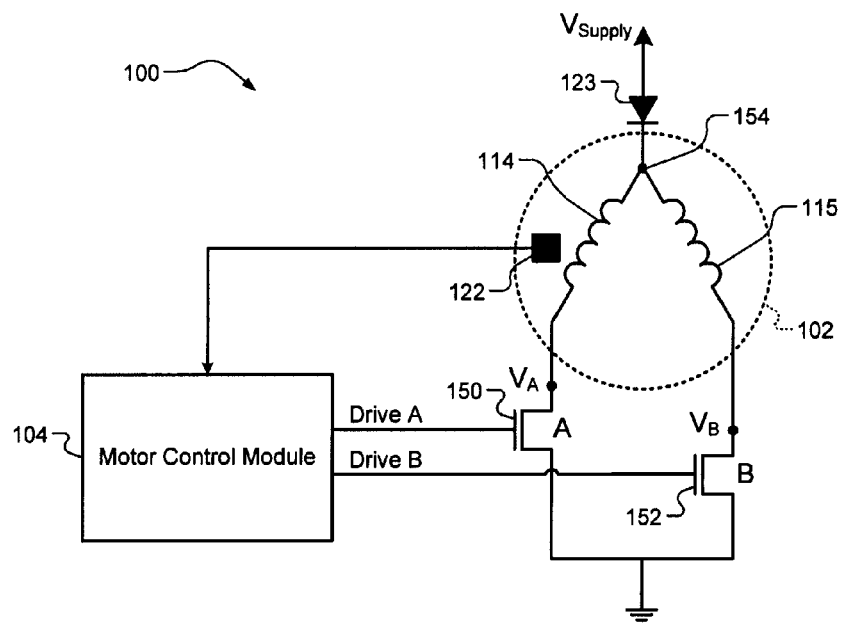
FIG. 2A is a cooling fan system that includes driving transistors according to the prior art.
Figure 2B:
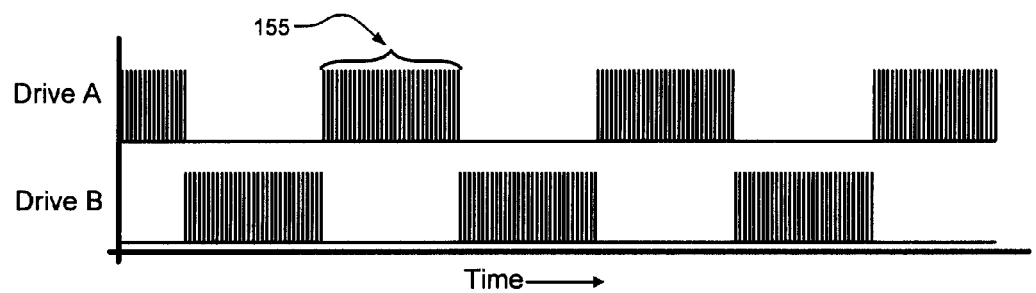
FIG. 2B illustrates signals generated at terminals of a motor when a rotor is driven using pulse-width modulation driving signals according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

An external force applied to a rotor may disturb a speed and/or direction of the rotor. The external force may be applied to a device (e.g., fan blade) connected to the rotor. For example, airflow from another fan or an object in the path of the fan blade may disturb rotation of the fan blade.

Motors used in fan assemblies typically include at least one Hall-effect sensor to detect when an external force disturbs the rotor. Hall-effect sensors, however, increase the cost of the motor. Additionally, Hall-effect sensors may fail, thereby reducing the reliability of the motor.

A disturbance detection system according to the present disclosure determines when an external force disturbs the rotor without using the Hall-effect sensor. Instead, the disturbance detection system detects the external force based on voltages induced in stator coils of the motor when the rotor is disturbed. Elimination of the Hall-effect sensor may reduce a number of components included in the electric motor, and therefore may reduce the cost of the motor and increase the reliability of the motor.

The rotor may spin in a reverse direction when the rotor is disturbed during start-up, which may cause a decrease in airflow when the rotor drives a fan. The disturbance detection system may detect disturbances to the rotor when the rotor is started to prevent the rotor from spinning in the reverse direction. The disturbance detection system drives the rotor to a predetermined position during start-up. The disturbance detection system detects when the rotor is disturbed based on voltages induced in stator coils of the motor when the rotor is driven to the predetermined position.

The rotational speed of the rotor may be decreased when the rotor is disturbed while spinning, which may cause a decrease in airflow when the rotor drives a fan. The disturbance detection system may detect disturbances to the rotor when the rotor is rotating. The disturbance detection system may determine lengths of periods between voltages induced in the stator coils. The lengths of periods may indicate the speed of the rotor. Accordingly, the disturbance detection system may determine when the rotor is disturbed based on changes in the speed of the rotor.

Figure 3:
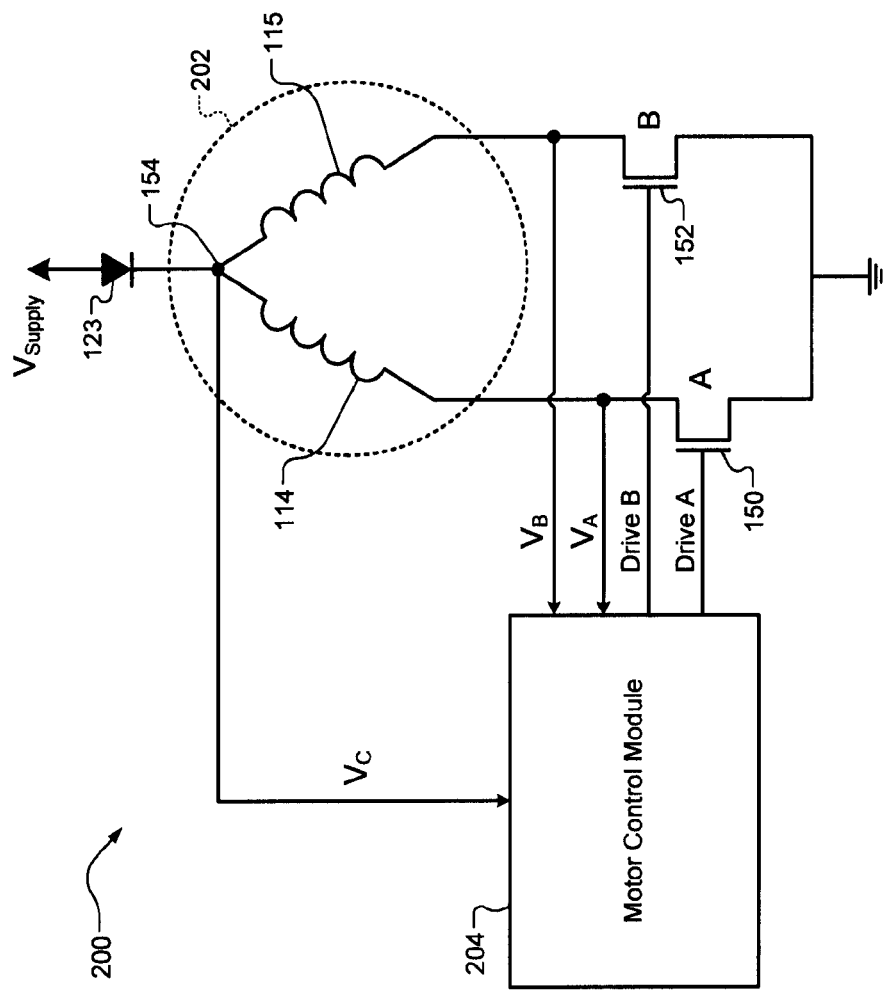
FIG. 3 is a motor system according to the present disclosure.

Referring now to FIG. 3, an exemplary motor system 200 according to the present disclosure includes a motor 202 and a motor control module 204. For example only, the motor 202 may include a two-phase brushless direct current (DC) motor. While the disturbance detection system is described as controlling the two-phase brushless DC motor, the disturbance detection system may also control other motor systems (e.g., three-phase motor systems).

The motor control module 204 may drive phase A and/or phase B of the motor 202. The motor control module 204 may measure $V_A$ and $V_B$. The motor control module 204 may also measure a voltage at the center tap 154 (hereinafter "$V_C$") of the motor 202. The motor control module 204 may drive phases A and B based on $V_A$, $V_B$, and $V_C$.

The power supply voltage ($V_{Supply}$) may connect to the center tap 154 via the diode 123. Accordingly, $V_C$ may be approximately a diode voltage drop below $V_{Supply}$. In some implementations, the motor system 200 may not include the diode 123. The motor control module 204 may control transistors A and B 150, 152 to drive phases A and B, respectively. While transistors A and B 150, 152 are illustrated and described as n-channel metal-oxide-semiconductor field-effect transistors, the motor system 200 may implement the disturbance detection system using other transistors and/or switches that provide similar functionality.

Transistors A and B 150, 152 may be referred to hereinafter as switches A and B 150, 152, respectively. Current may flow through coil A 114 to ground when the motor control module 204 closes switch A 150. Current may flow through coil B 115 to ground when the motor control module 204 closes switch B 152. Accordingly, the motor control module 204 may close switches A and B 150, 152 to drive phases A and B, respectively. Current may be restricted from flowing through coil A 114 when the motor control module 204 opens switch A 150. Current may be restricted from flowing through coil B 115 when the motor control module 204 opens switch B 152.

Generally, the motor control module 204 drives phases A and B separately to rotate the rotor 116. For example, the motor control module 204 may open switch B 152 when the motor control module 204 closes switch A 150. The motor control module 204 also may open switch A 150 when the motor control module 204 closes switch B 152.

In addition to rotating the rotor 116, the motor control module 204 may position the rotor 116 at a predetermined position. The position of the rotor 116 may indicate an orientation of the rotor 116 relative to poles A1 106, A2 108, B1 110, and B2 112. The motor control module 204 may drive phase A and/or phase B to adjust the position of the rotor 116.

Figure 4A:
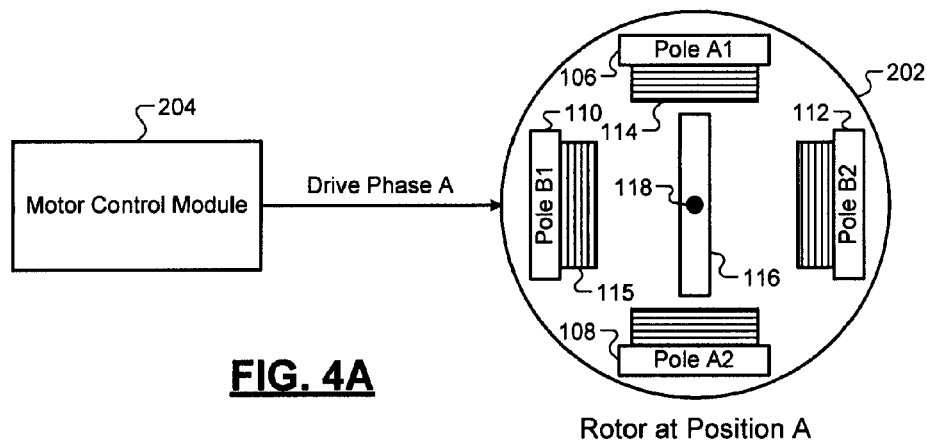
FIG. 4A illustrates a rotor at position A.
Figure 4B:
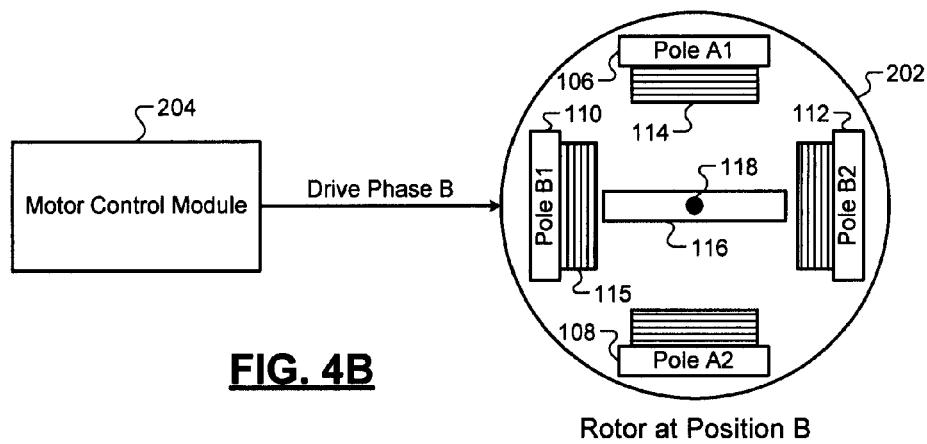
FIG. 4B illustrates the rotor at position B.

Referring now to FIGS. 4A and 4B, the position of the rotor 116 may include alignment of the rotor 116 along pole pair A or pole pair B. In FIG. 4A, the motor control module 204 drives phase A to adjust the position of the rotor 116 along pole pair A (hereinafter "position A"). In FIG. 4B, the motor control module 204 drives phase B to adjust the position of the rotor 116 along pole pair B (hereinafter "position B").

Figure 5:
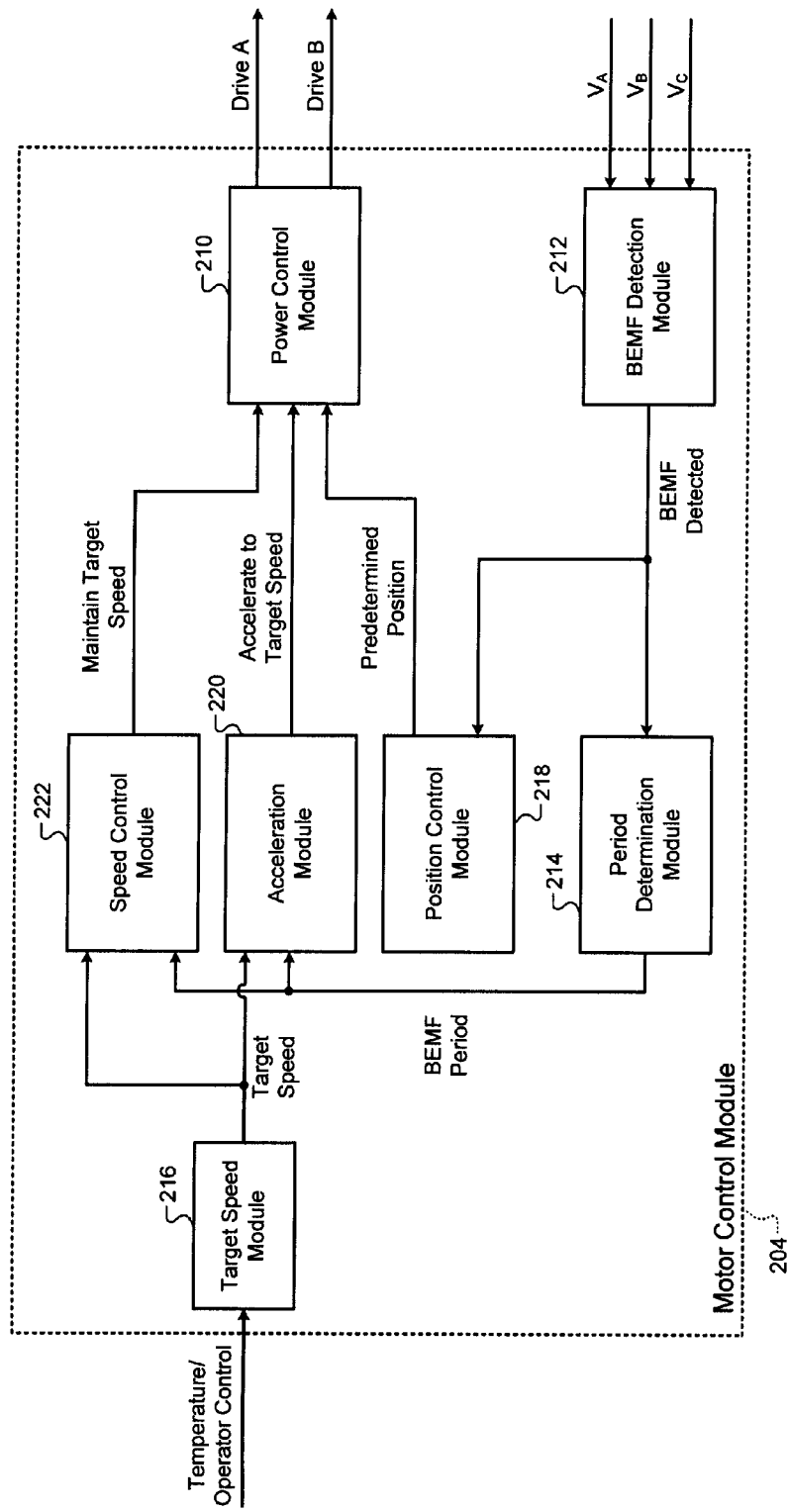
FIG. 5 is a motor control module according to the present disclosure.

Referring now to FIG. 5, the motor control module 204 includes a power control module 210, a back electromotive force (BEMF) detection module 212, and a period determination module 214. The power control module 210 may drive phase A and/or phase B to adjust the position and rotational speed of the rotor 116. The BEMF detection module 212 measures voltages induced in coil A 114 and coil B 115 when the rotor 116 rotates.

The period determination module 214 may determine a length of a period between the voltages induced in coil A 114 and coil B 115. Accordingly, the period determination module 214 may determine the speed of the rotor 116 based on the length of the period between the induced voltages.

The motor control module 204 also includes a target speed module 216, a position control module 218, an acceleration module 220, and a speed control module 222. The target speed module 216 may generate a target speed of the rotor 116 based on a speed requested by an input device.

The position control module 218 may control the position of the rotor 116 via the power control module 210 to position the rotor 116 at the predetermined position. Accordingly, the position control module 218 may drive phase A or drive phase B to control the position of the rotor 116.

The acceleration module 220 may control acceleration of the rotor 116 via the power control module 210. Accordingly, the acceleration module 220 may drive phases A and/or B to accelerate the rotor 116 from the predetermined position to the target speed.

The speed control module 222 may control the rotor 116 via the power control module 210 to maintain the speed of the rotor 116 at the target speed. Accordingly, the speed control module 222 may drive phases A and/or B to control the speed of the rotor 116.

The rotor 116 may induce a BEMF (hereinafter "induced BEMF") in coil A 114 and/or coil B 115 when the rotor 116 rotates. The BEMF detection module 212 may detect the induced BEMF based on $V_A$, $V_B$, and $V_C$. The BEMF detection module 212 may detect the induced BEMF in coil A 114 based on a comparison of $V_A$ and $V_C$. For example, the BEMF detection module 212 may detect the induced BEMF in coil A 114 when $V_A$ transitions from a value greater than $V_C$ to a value less than $V_C$. The BEMF detection module 212 may detect the induced BEMF in coil B 115 based on a comparison of $V_B$ and $V_C$. For example, the BEMF detection module 212 may detect the induced BEMF in coil B 115 when $V_B$ transitions from a value greater than $V_C$ to a value less than $V_C$.

The period determination module 214 may determine a length of a period between detections of induced BEMF. The period between detections of induced BEMF may be referred to hereinafter as a "BEMF period." For example, the period determination module 214 may determine a length of a BEMF period based on an amount of time between an induced BEMF in coil A 114 followed by an induced BEMF in coil B 115. Additionally, the period determination module 214 may determine the length of the BEMF period based on an amount of time between a first induced BEMF in coil A 114 and a second induced BEMF in coil A 114.

The period determination module 214 may determine a current speed of the rotor 116 based on the BEMF period. For example, four BEMF periods may correspond to one revolution of the rotor 116. Accordingly, when the BEMF period has a length of T seconds, the period determination module 214 may determine the current speed of the rotor 116 is $(4 \times T)^{-1}$ revolutions per second. The length of the BEMF period may increase as the current speed of the rotor 116 decreases.

Figure 6A:
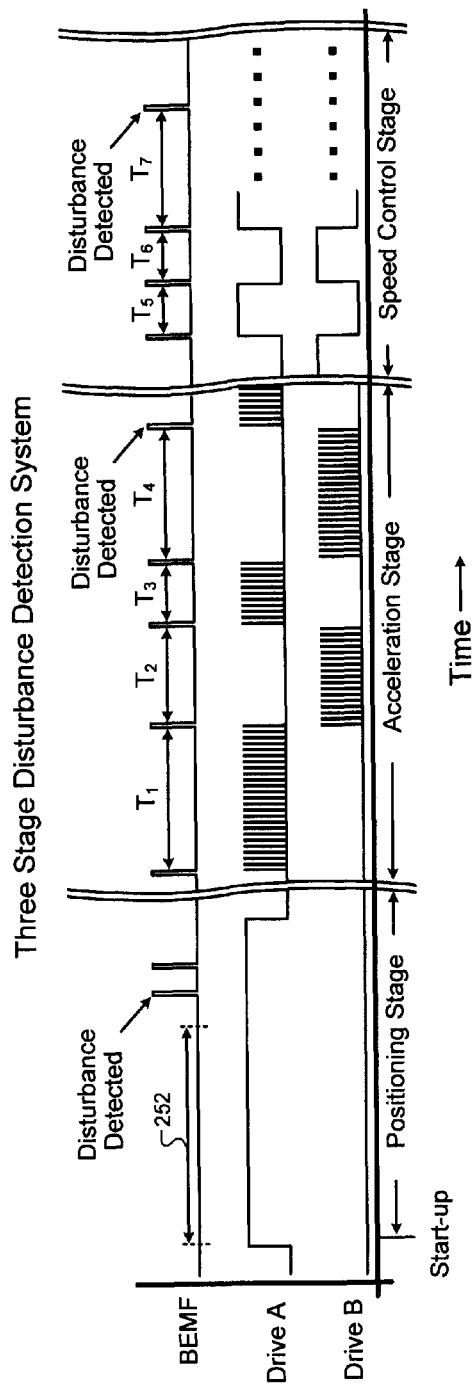
FIG. 6A is a graph illustrating three stages of a disturbance detection system according to the present disclosure.

Referring now to FIG. 6A, the motor control module 204 may implement the disturbance detection system in three stages: a positioning stage, an acceleration stage, and a speed control stage. The motor control module 204 may implement the positioning stage, the acceleration stage, and the speed control stage in series. The beginning of the positioning stage may be referred to hereinafter as "start-up."

The disturbance detection system may initiate rotation of the rotor 116 at start-up. For example, the rotor 116 may be stationary at start-up and the target speed may be greater than zero. The disturbance detection system may return to start-up when the rotor 116 is disturbed.

The rotor 116 may be disturbed during each of the three stages of the disturbance detection system. The motor control module 204 may detect when the rotor 116 is disturbed during each of the three stages based on induced BEMF. Detection of a disturbance during each of the three stages will now be discussed in turn.

During the positioning stage, the motor control module 204 may position the rotor 116 at the predetermined position. The motor control module 204 may determine whether the rotor 116 is disturbed from the predetermined position based on induced BEMF. The disturbance detection system may return to start-up when a disturbance is detected during the positioning stage. The disturbance detection system may return to start-up to prevent starting the rotor 116 in a reverse direction. For example, if the rotor 116 is disturbed from the predetermined position in the reverse direction, the rotor 116 may rotate in the reverse direction during the acceleration stage.

During the acceleration stage, the motor control module 204 may accelerate the rotor 116 from zero revolutions per minute (RPM) to the target speed. The motor control module 204 may determine whether the rotor 116 is disturbed during acceleration based on induced BEMF. The disturbance detection system may return to start-up when a disturbance is detected during the acceleration stage.

During the speed control stage, the motor control module 204 may adjust the speed of the rotor 116 to maintain the target speed. The motor control module 204 may determine whether the rotor 116 is disturbed during speed control based on induced BEMF. The disturbance detection system may return to start-up when a disturbance is detected during the speed control stage.

The positioning stage begins when the position control module 218 controls the rotor 116 to position the rotor 116 at positions A or B. For example, the position control module 218 may drive phase A to position the rotor 116 at position A. The position control module 218 may position the rotor 116 at position A for a predetermined driving period (e.g., less than one second).

The rotor 116 may be disturbed from position A when the position control module 218 is driving phase A. The rotor 116 may induce a BEMF in coil B 115 when the rotor 116 is disturbed from position A. The BEMF detection module 212 may measure $V_B$ when the position control module 218 drives phase A to detect the induced BEMF in coil B 115. The BEMF detection module 212 may detect the induced BEMF at $V_B$ when the position of the rotor 116 deviates from position A due to the disturbance. The position control module 218 may stop driving phase A when the BEMF detection module 212 detects the induced BEMF at $V_B$. The position control module 218 may restart the disturbance detection system when the BEMF detection module 212 detects the induced BEMF at $V_B$.

Figure 6B:
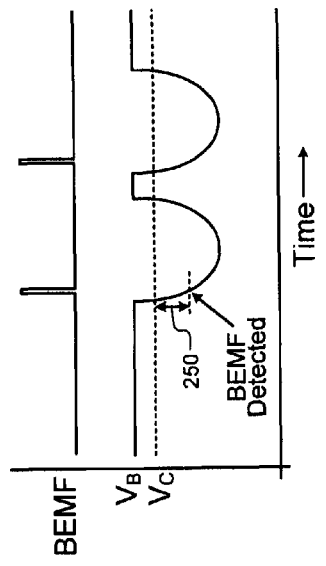
FIG. 6B is a graph illustrating detection of induced voltages during a positioning stage of the disturbance detection system according to the present disclosure.

Referring now to FIG. 6B, $V_B$ may be approximately equal to $V_C$ when the position control module 218 drives phase A. For example only, $V_B$ may decrease below $V_C$ when the rotor 116 is disturbed. The BEMF detection module 212 may detect an induced BEMF when $V_B$ decreases to less than a threshold below $V_C$. The threshold is illustrated at 250. The threshold may correspond to an amount of rotor movement that is tolerable during the positioning stage. A larger threshold may correspond to a larger movement of the rotor 116 from position A. Accordingly, tolerance of the disturbance detection system during the positioning stage may be calibrated via the threshold.

Referring back to FIG. 6A, the two pulses along the BEMF line indicate when the BEMF detection module 212 detects the induced BEMF during the positioning stage. The disturbance detection system may return to start-up when the BEMF detection module 212 detects the induced BEMF during the positioning stage. The disturbance detection system may continue to the acceleration stage when no disturbances are detected during the predetermined driving period.

A period of time (hereinafter "settling period") may pass before the rotor 116 settles at position A after the position control module 218 drives phase A. For example, the settling period may include a period during which the rotor 116 is rotating toward position A. The settling period may also include a period during which the rotor 116 oscillates about position A until the rotor 116 settles at position A. The BEMF detection module 212 may detect an induced BEMF during the settling period before the rotor 116 settles at position A.

Detection of induced BEMF during the settling period may not indicate a disturbance to the rotor 116. Accordingly, the BEMF detection module 212 may begin measuring $V_B$ a delay period 252 after the position control module begins driving phase A.

During the acceleration stage, the acceleration module 220 may control the speed of the rotor 116 to accelerate the rotor 116 to the target speed. The acceleration module 220 may drive phases A and B to accelerate the rotor 116 to the target speed (e.g., using pulse-width modulation driving signals). For example only, the acceleration module 220 may accelerate the rotor 116 to the target speed within 1-2 seconds when the target speed is a maximum speed of the rotor 116 (e.g., 3000-4000 RPM).

The acceleration module 220 may determine the current speed of the rotor based on a length of a BEMF period. Accordingly, the acceleration module 220 may determine a change in the current speed of the rotor 116 based on two consecutive BEMF periods. Consecutive BEMF periods may decrease in length when the acceleration module 220 accelerates the rotor 116.

The rotor 116 may be disturbed during the acceleration stage. The acceleration module 220 may determine that the rotor 116 is disturbed based on a comparison of two consecutive BEMF periods, for example. The rotor 116 may decelerate when the rotor 116 is disturbed during the acceleration stage. Accordingly, the acceleration module 220 may determine that the rotor 116 has been disturbed when a second BEMF period, measured after a first BEMF period, is longer than the first BEMF period.

Exemplary BEMF periods $T_1$, $T_2$, $T_3$, and $T_4$ illustrate detection of a disturbance during the acceleration stage. BEMF periods $T_1$, $T_2$, and $T_3$ decrease in length as the acceleration module 220 accelerates the rotor 116. A length of the BEMF period $T_4$ however is greater than the previously determined BEMF period $T_3$. The increase in length of the BEMF period $T_4$ may indicate that the rotor 116 was disturbed during BEMF period $T_4$. Accordingly, the acceleration module 220 may determine that the rotor 116 was disturbed after determining that $T_4$ was greater than $T_3$.

In some implementations, the acceleration module 220 may include a minimum period threshold that indicates a minimum acceptable BEMF period length. The acceleration module 220 may determine that the rotor 116 was disturbed when the BEMF period is less than the minimum period threshold.

The acceleration module 220 may stop driving phases A and B when the acceleration module 220 determines that the rotor 116 was disturbed. The disturbance detection system may return to start-up when the acceleration module 220 determines that the rotor 116 was disturbed. The disturbance detection system may continue to the speed control stage when no disturbances are detected during the acceleration stage.

The speed control module 222 may control the speed of the rotor 116 after the acceleration module 220 accelerates the rotor 116 to the target speed. The speed control stage may begin when the speed control module 222 controls the speed of the rotor 116. The speed control module 222 may adjust the speed of the rotor 116 based on a difference between the current speed of the rotor 116 and the target speed.

The speed control module 222 may determine the current speed of the rotor 116 based on the BEMF period. When the current speed is less than the target speed, the speed control module 222 may increase the speed of the rotor 116 to achieve the target speed. When the current speed is greater than the target speed, the speed control module 222 may decrease the speed of the rotor 116 to achieve the target speed.

The speed control module 222 may control the speed of the rotor 116 based on induced EMF according to-U.S. patent application Ser. No. 12/480,161, filed Jun. 8, 2009, titled "Motor Speed Control System and Method Without Pulse-Width Modulation" and U.S. Provisional Application No. 61/118,820, filed on Dec. 1, 2008, which are incorporated herein by reference in their entirety.

The target speed may vary during the speed control stage. The target speed module 216 may generate the target speed based on the speed requested by the input device. The input device may include a switch. Accordingly, an operator may request the target speed using the switch. For example, the operator may use the switch to select from a range of speeds. The input device may request the target speed based on sensed ambient temperature. For example, when the rotor 116 drives a fan blade, the input device may request an increase in the target speed when the ambient temperature increases. Accordingly, the increase in the target speed may result in an increased airflow that cools components connected to the motor system 200.

Typically, the speed control module 222 may gradually modulate the speed of the rotor 116 during the speed control stage. Accordingly, lengths of consecutive BEMF periods may change gradually during the speed control stage. For example, lengths of consecutive BEMF periods may change by less than a BEMF period threshold. The lengths of consecutive BEMF periods may change by greater than the BEMF period threshold when the rotor 116 is disturbed during the speed control stage.

The speed control module 222 may compare consecutive BEMF periods to determine an amount of change between consecutive BEMF periods. The speed control module 222 may determine that the rotor 116 has been disturbed when consecutive BEMF periods vary by greater than the BEMF period threshold.

In some implementations, the speed control module 222 may compare a first BEMF period to a second BEMF period that was determined after the first BEMF period. The speed control module 222 may determine that the rotor 116 was disturbed when the second BEMF period is not within a BEMF period threshold of the first BEMF period. For example, the speed control module 222 may determine that the rotor 116 was disturbed when the second BEMF period is greater than the first BEMF period by a BEMF period threshold. Additionally, the speed control module 222 may determine that the rotor 116 was disturbed when the second BEMF period is less than the first BEMF period by a BEMF period threshold. The BEMF period threshold may be based on the first BEMF period. For example, the BEMF period threshold may be a percentage of the first BEMF period (e.g., approximately 10%). The BEMF period threshold may be based on parameters of the motor 202.

Exemplary BEMF periods $T_5$, $T_6$, and $T_7$ illustrate detection of a disturbance during the speed control stage. BEMF periods $T_5$ and $T_6$ are roughly equivalent, indicating that the rotor 116 has not been disturbed. A length of the BEMF period $T_7$ however is greater than a length of the previously determined BEMF period $T_6$. The increase in length of the BEMF period from $T_6$ to $T_7$ may indicate that the rotor 116 was disturbed during period $T_7$. Accordingly, the speed control module 222 may determine that the rotor 116 was disturbed when the BEMF period $T_7$ is greater than the BEMF period $T_6$ by a BEMF period threshold.

The speed control module 222 may stop driving phases A and B when the speed control module 222 determines that the rotor 116 was disturbed. The disturbance detection system may return to start-up when the speed control module 222 determines that the rotor 116 was disturbed.

Figure 7:
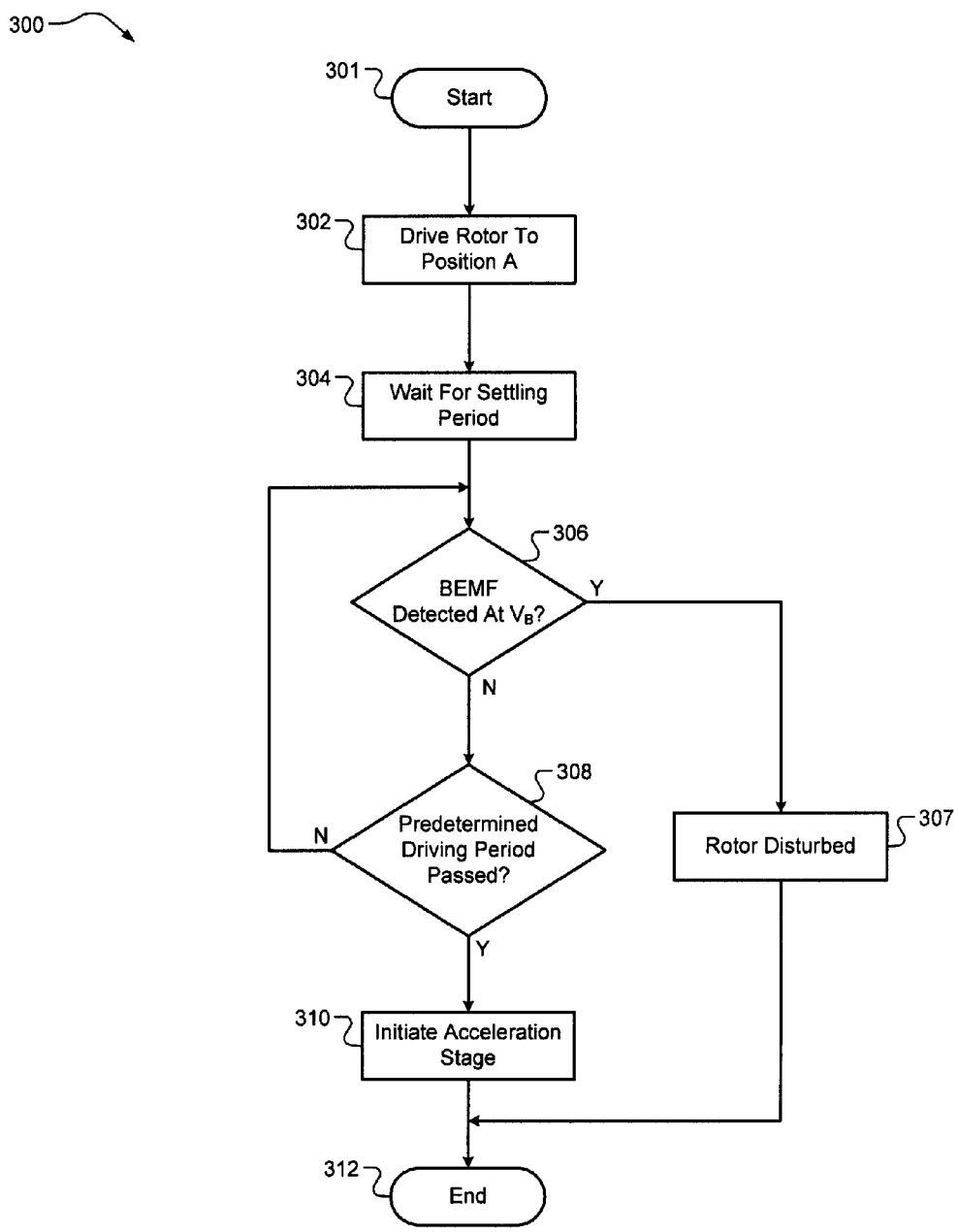
FIG. 7 illustrates a method for detecting a disturbance to the rotor during the positioning stage according to the present disclosure.

Referring now to FIG. 7, a method 300 for detecting a disturbance to the rotor during the positioning stage begins at 301. At 302, the position control module 218 drives the rotor 116 to position A. At 304, the BEMF detection module 212 waits for the settling period.

At 306, the BEMF detection module 212 determines whether the induced BEMF is detected at $V_B$. If the result at 306 is true, the method 300 continues at 307. If the result at 306 is false, the method 300 continues at 308. At 307, the position control module 218 determines that the rotor 116 was disturbed. At 308, the position control module 218 determines whether the predetermined driving period has passed. If the result at 308 is false, the method 300 repeats 306. If the result at 308 is true, the method 300 continues at 310. At 310, the disturbance detection system initiates the acceleration stage. The method 300 ends at 312.

Figure 8:
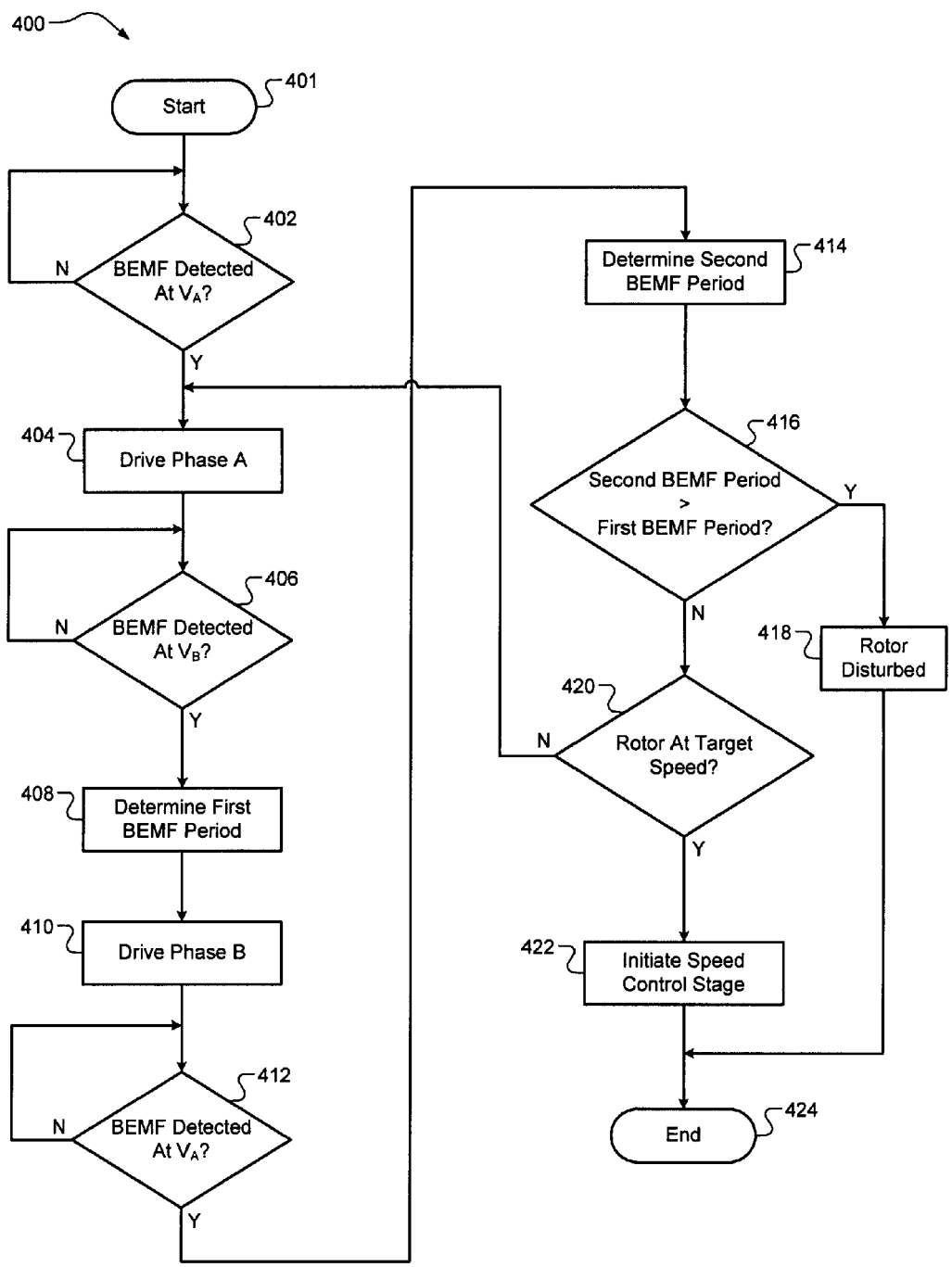
FIG. 8 illustrates a method for detecting a disturbance to the rotor during an acceleration stage according to the present disclosure.

Referring now to FIG. 8, a method 400 for detecting a disturbance to the rotor during the acceleration stage begins at 401. At 402, the BEMF detection module 212 determines whether the induced BEMF is detected at $V_A$. If the result at 402 is false, the method 400 repeats 402. If the result at 402 is true, the method 400 continues at 404. At 404, the acceleration module 220 drives phase A to accelerate the rotor 116. At 406, the BEMF detection module 212 determines whether the induced BEMF is detected at $V_B$. If the result at 406 is false, the method 400 repeats 406. If the result at 406 is true, the method 400 continues at 408.

At 408, the period determination module 214 determines a first BEMF period. At 410, the acceleration module 220 drives phase B to accelerate the rotor 116. At 412, the BEMF detection module 212 determines whether the induced BEMF is detected at $V_A$. If the result at 412 is false, the method 400 repeats 412. If the result at 412 is true, the method 400 continues at 414. At 414, the period determination module 214 determines a second BEMF period.

At 416, the acceleration module 220 determines whether the second BEMF period is greater than the first BEMF period. If the result at 416 is true, the method 400 continues at 418. If the result at 416 is false, the method 400 continues at 420. At 418, the acceleration module 220 determines that the rotor 116 was disturbed. At 420, the acceleration module 220 determines whether the rotor 116 is at the target speed. If the result at 420 is false, the method 400 continues at 404. If the result at 420 is true, the method 400 continues at 422. At 422, the disturbance detection system initiates the speed control stage. The method 400 ends at 424.

Figure 9:
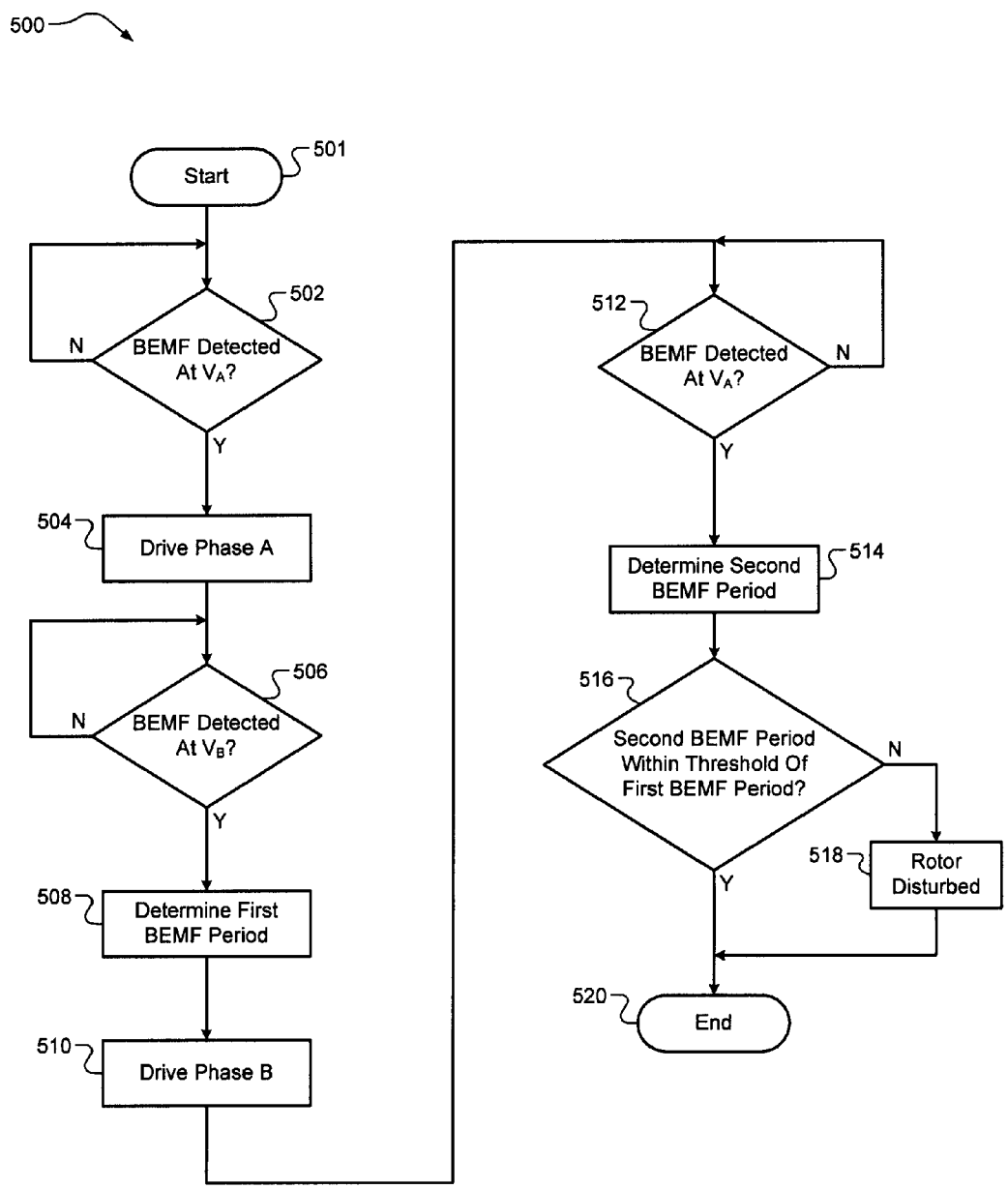
FIG. 9 illustrates a method for detecting a disturbance to the rotor during a speed control stage according to the present disclosure.

Referring now to FIG. 9, a method 500 for detecting a disturbance to the rotor during the speed control stage begins at 501. At 502, the BEMF detection module 212 determines whether the induced BEMF is detected at $V_A$. If the result at 502 is false, the method 500 repeats 502. If the result at 502 is true, the method 500 continues at 504. At 504, the speed control module 222 drives phase A. At 506, the BEMF detection module 212 determines whether the induced BEMF is detected at $V_B$. If the result at 506 is false, the method 500 repeats 506. If the result at 506 is true, the method 500 continues at 508.

At 508, the period determination module 214 determines a first BEMF period. At 510, the speed control module 222 drives phase B. At 512, the BEMF detection module 212 determines whether the induced BEMF is detected at $V_A$. If the result at 512 is false, the method 500 repeats 512. If the result at 512 is true, the method 500 continues at 514. At 514, the period determination module 214 determines a second BEMF period.

At 516, the speed control module 222 determines whether the second BEMF period is within a BEMF period threshold of the first BEMF period. If the result at 516 is false, the method 500 continues at 518. If the result at 516 is false, the method 500 continues at 520. At 518, the speed control module 222 determines that the rotor 116 was disturbed. The method 500 ends at 520.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system for detecting whether a rotation of a rotor of a motor is disturbed by a force external to the motor, wherein the rotation of the rotor occurs based on application of a voltage or a current to a coil of the motor, the system comprising:
    a back electromotive force (BEMF) detection module configured to detect, during each rotation of the rotor, a back electromotive force (BEMF) induced in the coil of the motor;
    a period determination module configured to determine a length of a period between each detection of the back electromotive force (BEMF) induced in the coil of the motor; and
    a control module configured to, based on the length of the period between each detection of the back electromotive force (BEMF) induced in the coil of the motor, determine whether the rotation of the rotor is disturbed by a force external to the motor.

2. The system of claim 1, wherein during an acceleration of the motor, the control module is configured to determine that the rotation of the rotor is disturbed by a force external to the motor in response to:
    an increasing variation in the length of the period between each detection of the back electromotive force (BEMF) induced in the coil of the motor.

3. The system of claim 1, wherein during an acceleration of the motor, the control module is configured to determine that the rotation of the rotor is disturbed by a force external to the motor in response to:
    an increase in the length of the period between each detection of the back electromotive force (BEMF) induced in the coil of the motor.

4. The system of claim 1, wherein during an acceleration of the motor the control module is configured to determine that the rotation of the rotor is disturbed by a force external to the motor in response to:
    a length of a period between two detections of the back electromotive force (BEMF) induced in the coil of the motor being less than a predetermined minimum threshold.

5. The system of claim 1, wherein while the motor is being maintained at a constant speed, the control module is configured to determine that the rotation of the rotor is disturbed by a force external to the motor in response to:
    a variation in the length of the period between each detection of the back electromotive force (BEMF) induced in the coil of the motor being greater than a predetermined threshold.

6. The system of claim 1, wherein while the rotor is being moved to a predetermined position, the control module is configured to determine that the rotation of the rotor is disturbed by a force external to the motor in response to:
    a detection of the back electromotive force (BEMF) induced in the coil of the motor.

7. The system of claim 1, further comprising a power control module configured to configured to supply power to the motor to rotate the rotor.

8. A method for detecting whether a rotation of a rotor of a motor is disturbed by a force external to the motor, wherein the rotation of the rotor occurs based on application of a voltage or a current to a coil of the motor, the method comprising:
    detecting, during each rotation of the rotor, a back electromotive force (BEMF) induced in the coil of the motor;
    determining a length of a period between each detection of the back electromotive force (BEMF) induced in the coil of the motor; and
    based on the length of the period between each detection of the back electromotive force (BEMF) induced in the coil of the motor, determining whether the rotation of the rotor is disturbed by a force external to the motor.

9. The method of claim 8, further comprising, during an acceleration of the motor, determining that the rotation of the rotor is disturbed by a force external to the motor in response to:
    an increasing variation in the length of the period between each detection of the back electromotive force (BEMF) induced in the coil of the motor.

10. The method of claim 8, further comprising, during an acceleration of the motor, determining that the rotation of the rotor is disturbed by a force external to the motor in response to:
    an increase in the length of the period between each detection of the back electromotive force (BEMF) induced in the coil of the motor.

11. The method of claim 8, further comprising, during an acceleration of the motor, determining that the rotation of the rotor is disturbed by a force external to the motor in response to:

a length of a period between two detections of the back electromotive force (BEMF) induced in the coil of the motor being less than a predetermined minimum threshold.

12. The method of claim 8, further comprising, while the motor is being maintained at a constant speed, determining that the rotation of the rotor is disturbed by a force external to the motor in response to:
- a variation in the length of the period between each detection of the back electromotive force (BEMF) induced in the coil of the motor being greater than a predetermined threshold.

13. The method of claim 8, further comprising, while the rotor is being moved to a predetermined position, determining that the rotation of the rotor is disturbed by a force external to the motor in response to:
- a detection of the back electromotive force (BEMF) induced in the coil of the motor.

14. The method of claim 8, further comprising supplying power to the motor to rotate the rotor.

* * * * *